United States Patent [19]
Gilbu

[11] 3,871,409
[45] Mar. 18, 1975

[54] REINFORCED SYNTHETIC PIPE WALL CONSTRUCTION

[75] Inventor: Agnar Gilbu, Conroe, Tex.

[73] Assignee: Owens-Corning Fiberglas Corporation, Toledo, Ohio

[22] Filed: May 21, 1973

[21] Appl. No.: 361,936

[52] U.S. Cl. .............................. 138/174, 161/141
[51] Int. Cl. .............................................. F16l 9/12
[58] Field of Search ........... 138/172, 173, 174, 175, 138/176, 177, 141; 264/DIG. 53, 310, 311; 161/141, 151, 156

[56] References Cited
UNITED STATES PATENTS

| | | | |
|---|---|---|---|
| 912,318 | 2/1909 | McMahon | 138/175 X |
| 3,520,749 | 7/1970 | Rubenstein | 138/175 X |

Primary Examiner—Jerry W. Myracle
Attorney, Agent, or Firm—Carl G. Staelin; John W. Overman; Hiram P. Settle, Jr.

[57] ABSTRACT

A fluid retaining wall or pipe particularly suitable for underground installation having a reinforced thermosetting resin construction. The wall of the pipe consists essentially of a thermosetting resin matrix, chopped glass fibers and a pulverulent filler such as sand distributed through out the matrix and filament wound, continuous glass fibers within the resin matrix, preferably distributed primarily adjacent the interior and exterior surfaces of the cylindical wall. The disclosed method includes applying the resin matrix in a liquid form to a continuously rotating cylindrical form, distributing the sand and chopped glass fibers within the matrix, winding the glass filaments helically in the matrix, and heating the pipe to cure the matrix.

13 Claims, 3 Drawing Figures

REINFORCED SYNTHETIC PIPE WALL CONSTRUCTION

BACKGROUND AND BRIEF DESCRIPTION OF THE INVENTION

The desirability of utilizing non-metallic underground storage conduits, tanks and the like has long been recognized. The desirability of utilizing synthetic resins, such as polyester resins or the like reinforced with glass fibers has been proposed to avoid the corrosion which inevitably occurs in metal conduits, pipes and receptacles.

Reinforced synthetic resin conduits have been developed and are on sale, but problems exist in the design of such conduits to withstand the appreciable compression forces engendered by the underground location of the conduits. Reinforced synthetic resin conduits having filler materials non-uniformly distributed in a resin matrix have been suggested by the prior art, as disclosed in U.S. Pat. Nos. 3,406,724 an 3,604,465. The need remains however for a wall construction, which is relatively simple and inexpensive to form and suitable to withstand the substantial forces encountered in forming the wall structure, particularly during curing of the resin, and the forces encountered in underground installations.

The disclosed apparatus for forming the improved wall construction and performing the method of this invention may utilize a continuous band-type mandrel, such as disclosed in the U.S. Pats. of Poulsen, Nos. 3,464,879, 3,655,489 and 3,679,521. In the disclosed apparatus of Poulsen, the cylindrical tank or pipe wall is built upon a mandrel surface which comprises a narrow spirally wrapped, continuously advancing band of steel, the band edges abutting one another, to form a smooth cylindrical surface. As the band advances, it is normally covered by a parting layer, preferably formed of a plastic sheeting or band which is wider than the mandrel bands.

The cylindrical wall construction of this invention includes a cured thermosetting resin matrix having randomly oriented chopped glass fibers and a pulverulent filler suspended therein. Filament wound, continuous glass fibers are also suspended within the resin matrix, preferably concentrated at the interior and exterior surface portions of the cylindrical wall. In one of the disclosed embodiments, the chopped glass fibers and pulverulent filler are evenly distributed through the resin matrix. In the other embodiment, the pulverulent filler and glass fibers vary through the radial thickness of the wall in inverse proportion to one another, with the concentration of the glass fibers being greater adjacent the interior and exterior surfaces of the cylindrical wall and the concentration of the pulverulent filler greater in the central portion of the wall. The precise concentrations of the constituents will depend upon the particular application of the conduit or container.

In the preferred embodiment of the invention, the thermosetting resin matrix comprises from about 30 to 40 percent by weight of the wall, the chopped glass fibers comprise from about 10 to 20 percent by weight of the wall and the pulverulent filler, preferably sand, comprises about 20 to 50 percent by weight of the wall. The interior and exterior portions of the wall together define about 40 percent of the total wall thickness, wherein at least 60 percent of the filament windings are concentrated. In the preferred embodiment, the filament windings comprise about 5 to 30 percent by weight of the cylindrical wall.

The preferred method of this invention includes the steps of; applying the thermosetting resin matrix in a fluid state to the continuously rotating cylindrical form, such as described above, distributing the chopped glass fibers preferably in random orientation and the pulverulent filler in the resin matrix, while continuing the rotation of the form, winding helically the continuous glass fibers in the fluid matrix and heating the cylindrical wall to cure the thermosetting resin. The resultant cylindrical wall is able to withstand the substantial forces encountered in underground installation and avoids cracking or the building of stresses encountered in curing of the thermosetting resin.

Other advantages and meritorious features of the disclosed invention will more fully appear from the following Description of the Preferred Embodiments, the appended claims and the drawings, a description of which follows:

DESCRIPTION OF THE PREFERRED EMBODIMENTS AND METHOD

Figure 1:
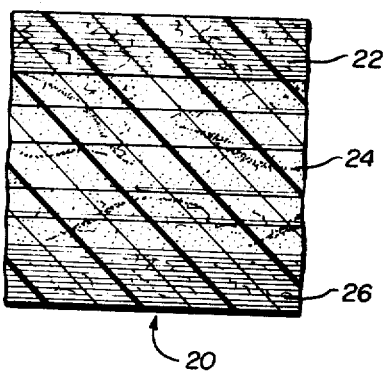
FIG. 1 is a cross-sectional view of the cylindrical wall construction of this invention in the direction of view arrows 1-1 in FIG. 2.

The reinforced resin wall section 20 shown in FIG. 1 includes four components; a thermosetting resin matrix, randomly oriented chopped glass fibers, a pulverulent or particulate filler, such as sand, and continuously wound glass filaments. The resin may be any suitable thermosetting resin, such as a polyester and accelerator, polyurethane or a type A bis-phenol. A suitable filler material is sand blasting or masonry sand, preferably having a uniform particulate size, such as 16 to 24 sieve. Other well-known particulate or granular fillers may also be utilized. The glass fibers, including the chopped fibers and filaments, may be any suitable glass fibers which are preferably resistant to corrosion or deterioration under the conditions of use, such as E glass disclosed in U.S. Pat. No. 2,334,931.

For the purposes of this description only, the reinforced resin wall 20 has been divided into three portions or segments; an exterior portion 22 adjacent the radial exterior of the cylindrical wall, a central portion 24 and an interior portion 26 adjacent the interior surface of the wall. The interior and exterior portions, 26 and 22 respectively, each define 20 percent of the total wall thickness and the central portion 24 defines 60 percent. It will be understood that the wall 20 is not limited to a cylindrical wall or pipe, except when manufactured by the method of this invention. The preferred compositions of the composite wall 20 will be more fully understood by first describing the apparatus and method shown in FIGS. 2 and 3.

Figure 2:
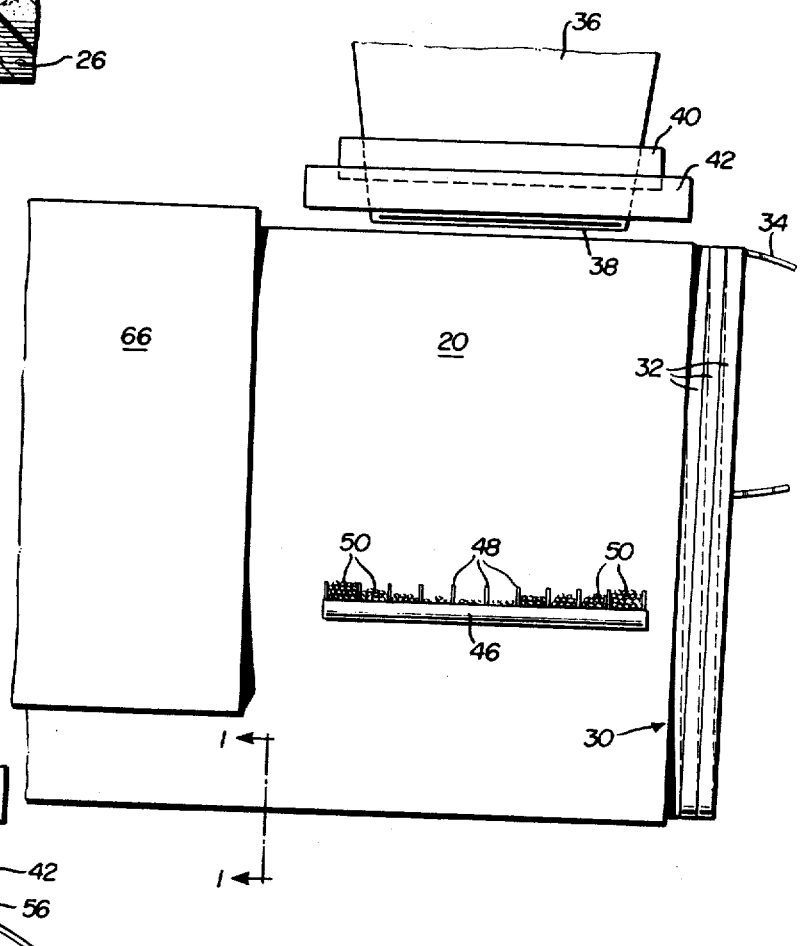
FIG. 2 is a suitable apparatus for performing the method of this invention.
Figure 3:
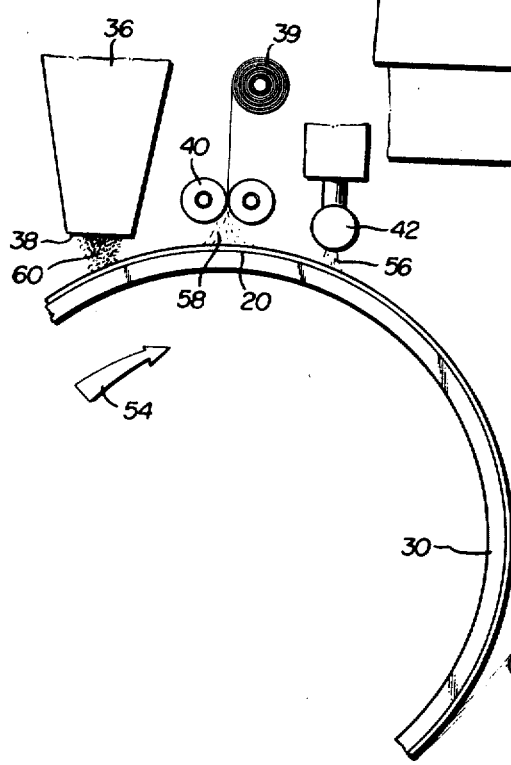
FIG. 3 is an end view of FIG. 2.

As shown in FIGS. 2 and 3, reference number 30 refers generally to a cantilevered support structure or mandrel of the "continuous ribbon" type, such as disclosed in the U.S. Pats. to Poulsen, Nos. 3,464,879, 3,655,489 and 3,679,521. The Poulsen patents disclose a pipe or tube making apparatus wherein a cylindrical mandrel is defined by a continuously traveling steel band 32 supported upon an internal structure such that the bands 32 move continuously in a helical pattern. The edges of successive laps of the bands abut one another to define a continuous, cylindrical, helically traveling exterior mandrel surface.

As shwon and described in the above referenced patents of Poulsen, the bands 32 travel downwardly and to the left. When the band reaches the end of the support surface, the band is returned axially of the cylindrical mandrel 30, the return position of the band being indicated by number 34. This band return position is simply fed radially outwardly onto the support structure to reconstitute successive portions of the peripheral surface. All of the support surface, the method of feeding the band and the manner in which the return portions of the band are placed and positioned to reconstitute the movable surface are fully disclosed in the Poulsen patents.

As the band 32 advances, it is preferably covered by a parting layer, not shown, such as "Mylar" or similar relatively inert plastic sheeting in the form of a band which is wider than one of the mandrel bands 32. This parting sheet is self-overlapping and provides a liquid tight cover for the mandrel, as well as providing a parting sheet for the subsequent separation from the mandrel surface of the article built upon the mandrel.

As described above, the continuously formed cylindrical wall 20 is built on the mandrel 30 from a combination of chopped glass fibers, a particulate filler, glass filaments and resin. The sand or other pulverulent filler is fed from an overhead hopper 36 having a downwardly directed opening 38. The chopped glass fibers are supplied from a suitable creel 39 to a chopper 40. Thermosetting resin and accelerator, if required, is fed from a conventional resin sprinkler 42 having a plurality of downwardly opening apertures and the continuous glass filaments are fed from a plurality of creels 44 through a comb 46. The comb includes a plurality of teeth 48 which segregate the bundles of filaments 50 for the purposes set forth hereinbelow. The hopper 36, chopper 40 and resin sprinkler 42 are preferably spaced angularly such that they are not directly superimposed as shown in FIG. 3.

As described above, the band 32 is advanced in a helical pattern, the wall 20 superimposed thereon also advances helically, as shown by the arrow 54 in FIG. 3. The rate of advancement of the wall 20 is the same as the rate of advancement of the bands 32. It will then be appreciated that the concurrent supply of resin 56, chopped glass fibers 58, sand 60 and glass filaments 64 to the surface of the mandrel 30, as the mandrel surface advances successively therebeneath, will result in the build-up of successive layers of resin, chopped glass fibers, sand and glass filaments. The resin impregnating the glass and sand and embedding the glass and sand in a resin matrix. The proportions of the materials can be readily varied and, if desired, varied through the radial extent of the wall 20. The disclosed apparatus is suitable for forming cylindrical conduits for example, having a diameter of up to 8 feet. Normally, the wall thickness is approximately one percent of the diameter of the conduit. Cylindrical containers, such as underground storage tanks, may also be formed by the disclosed apparatus. After completion of the cylindrical wall, the wall passes through an oven 66 to cure the resin and complete the structure.

The method of this invention then includes applying a thermosetting resin matrix 56, in a fluid state, to a continuously rotating cylindrical form, which is the mandrel 30 in the disclosed apparatus. Chopped glass fibers 58 are distributed in the resin matrix in random orientation from the chopper 40. A plurality of fiberglass strands are fed from the creel 39 to the chopper 40. The sand 60 or other pulverulent filler is distributed in the resin matrix from the hopper 36 through opening 38. The method also includes winding helically continuous glass fibers 64 in the matrix, which are fed from creels 44 through comb 46, as described above.

As described above, the wall construction of this invention is built-up in successive layers and the reinforcing and filler materials are distributed over a number of helical layers, as shown in FIG. 2. Finally, the wall structure is heated in the oven 66 to cure the resin matrix. The oven 66 may be a conventional radiant heater oven and may enclose less than all of the pipe structure.

Specific examples and a description of the preferred compositions follows. The thermosetting resin preferably comprises about 40% by weight of the wall to assure wetting of the glass fibers and sand. A minimum of about 30% by weight has been found suitable. The concentration of resin is also preferably substantially constant through the radial extent of the wall. A thermosetting resin is preferred because thermosetting resins are dimensionally stable under heat after curing and are not subject to corrosion. The resin is also preferably resistant to deterioration or degradation in the underground environment. One major problem with a thermosetting resin is the shrinkage which occurs during curing. The resin builds thermostresses which will result in voids and cracks in the wall, making the structure unsuitable for underground installation. This problem has been solved in the wall structure of this invention by the unique combination of filler materials and wound glass filaments and chopped glass filters.

The glass filaments are wound on a helical angle which is equal to the helical angle of the mandrel bands 32, as described above and shown in FIG. 2. In the preferred embodiment, the layers of continuous glass filaments are concentrated in the exterior and interior wall portions 22 and 26, respectively. As shown in FIG. 2, the comb 46 includes a plurality of filaments 50, or more accurately bundles of filaments. And, the outside sections of the comb include a greater number of filaments to concentrate the filaments in the exterior and interior portions of the wall. The continuous helically would glass filaments in the exterior and interior portions of the wall, 22 and 26 respectively, are in hoop tension and serve to compress the wall to reduce the problems of shrinkage of the resin. The continuous glass filaments in the mid or center portion 24 form a "frame" which retains the filler materials, particularly the sand, during forming of the wall. The intermediate layers of continuous glass strand comprise rovings or bands of glass fiber, helically oriented. Each roving will be one of a plurality of side-by-side rovings in a band and the bands are wound in a helical form with spacing between the annuluses. In the example, the spacing between the annuluses is one-quarter inch. The one-quarter inch spacing will be filled with sand and retain the sand on the wall. Further, the filaments are wetted with resin to retain the filler materials.

The pulverulent filler, which in the disclosed embodiment is sand, provides at least three functions: the sand provides mass or bulk to the wall; the sand serves as a heat sink during curing; and, the sand improves the modulus of elasticity of the cylindrical structure. The purpose of the sand to serve as a bulk filler or stiffener in plastics has been known in the art. It is the combination of the thermosetting resin reinforcing which results in the improved structure. The sand improves the modulus of elasticity of the cylindrical wall by separating the continuous filament strands, particularly in the exterior wall portion 22. The strands are spaced by the sand and central filler materials from the axis of the cylindrical wall, improving the modulus of elasticity. Finally, the sand functions as a heat sink during curing of the resin. The thermosetting resin is cured by an exothermic reaction and the sand absorbs the heat of the reaction, thereby reducing shrinkage and avoiding cracking. In the preferred embodiment, the wall structure includes 20 to 50 percent, by weight of sand or other equivalent pulverulent filler, which provides the advantages described above. The sand is however substantially incompressible and therefore a compressible, thermally stable filler material is included in the preferred embodiment of the wall structure.

The chopped glass fibers are thermally stable and randomly oriented within the resin matrix to absorb compression and stresses in any direction. In the preferred embodiment, the composition includes about 15 percent by weight of chopped glass fibers for longitudinal strength or beam strength. The total fiber glass composition is about 20 to 40 percent by weight, wherein at least 25 percent of the total glass composition is the filament wound fibers. The preferred composition therefore includes about 10 to 20 percent of the chopped glass fibers. In one of the disclosed embodiments, the total glass composition is preferably inversely proportional to the percentage of sand, as described above. In this embodiment, the composition includes a minimum of 3 to 5 percent by weight in the central portion 24 of the wall to absorb thermostresses at the central portion. As the thermosetting resin cures, the resin is in tension, placing the filler materials in compression. The glass fibers then absorb the stresses and prevent cracking during curing. The chopped glass fibers are able to absorb compression in any plane, as described above.

The following examples include conduit constructions which are particularly suitable for underground drain pipes which have no internal pressure, low pressure pipes suitable for underground construction and high pressure pipes. The difference in wall construction depends upon the particular application of the wall structure and it will be understood that the wall structure of this invention is also suitable for other applications, including underground storage tanks, particularly cylindrical tanks and the like.

EXAMPLE 1 - DRAIN PIPES the following compositions are particularly suitable for low or zero pressure conduits and the like. A suitable composition by weight for the following drain pipe constructions includes about 5 percent by weight filament windings, 15 percent by weight randomly oriented chopped glass fibers, 40 to 50 percent by weight sand and 30 to 40 percent by weight resin. The wall portions refer to the interior wall portion 26 adjacent the interior of the cylindrical pipe construction, the central wall portion 24 and the exterior portion 22 adjacent the exterior surface of the pipe, as shown in FIG. 1.

| Example 1 A Wall Portion | Filament Windings | Chopped Fibers | Resin | Sand |
| --- | --- | --- | --- | --- |
| Interior 20% | 50% | 40% | 20% | 10% |
| Central 60% | — | 20% | 60% | 80% |
| Exterior 20% | 50% | 40% | 20% | 10% |
| Example 1 B | | | | |
| Interior 20% | 40% | 20% | 20% | 20% |
| Central 60% | 20% | 60% | 60% | 60% |
| Exterior 20% | 40% | 20% | 20% | 20% |

EXAMPLE 2 - LOW PRESSURE PIPES

The following example of a suitable composition for a low pressure pipe has less glass fibers in the interior and exterior wall portions because of the greater internal pressure in the pipe. A suitable overall composition for the low pressure pipe construction of this Example includes 15 percent by weight filament windings, 15 percent by weight chopped glass fibers, preferably randomly oriented, 30 to 40 percent by weight sand and 30 to 40 percent by weight thermosettting resin.

| Example 2 Wall Portion | Filament Windings | Chopped Fibers | Resin | Sand |
| --- | --- | --- | --- | --- |
| Interior 20% | 40% | 30% | 20% | 10% |
| Central 20% | 60% | 40% | 60% | 80% |
| Exterior 20% | 40% | 30% | 20% | 10% |

EXAMPLE 3 - HIGH PRESSURE PIPES

This example is particularly suitable for high pressure pipe constructions and underground containers having high internal pressure. Again, the percentage of glass fibers in the interior and exterior wall portions has been reduced because of the greater internal pressure which equalizes the external stresses and pressures. A suitable overall composition for the high pressure pipe construction of this Example includes 25 percent by weight filament fibers, 15 percent by weight chopped glass fibers, 20 to 30 percent by weight sand and 30 to 40 percent by weight resin. The following is a suitable example for a high pressure pipe construction.

Example 3

| Wall Portion | Filament Windings | Chopped Fibers | Resin | Sand |
|---|---|---|---|---|
| Interior 20% | 30% | 20% | 20% | 15% |
| Central 60% | 40% | 60% | 60% | 70% |
| Exterior 20% | 30% | 20% | 20% | 15% |

The wall constructions given in Examples 1 A, 2 and 3 vary the total glass fiber concentration in the wall portions 20, 24 and 26 such that the glass composition in inversely proportional to the sand concentration. All of the examples are given in weight percent of the total wall structure. The total glass content includes the filament windings and the chopped glass fibers. The glass fibers and sand are varied in these examples to take advantage of the physical properties of the glass fibers and sand for the particular application. In Example 1 A, for example, all of the glass filament windings and 80 percent of the chopped fibers are located in the interior and exterior wall portions 26 and 22 respectively and 80 percent of the sand is located in the central portion. In Examples 2 and 3, the concentration of the glass fibers in the interior and exterior wall portions is progressively reduced, because of the greater internal pressure.

In Example 1 B, the concentration of chopped glass fibers and sand is constant throughout the radial thickness of the pipe and only the filament windings are concentrated at the interior and exterior surfaces. In all of the examples, then, the resin is constant throughout the wall composition and the concentration of filament windings is varied for the reasons given hereinabove. In Example 3, 60 percent of the filament windings are concentrated in the interior and exterior wall portions.

The wall structure of this invention is light in weight, not subject to corrosion, relatively inexpensive and particularly suitable for underground installations. As stated above, underground installations subject the wall structure to impact and compressive loading, which may cause failure in other structures. Further, and more important, the wall structure of this invention utilizes the physical properties of the reinforcing and filler materials to avoid failure during the manufacture of the structure, which has been overlooked by many of the pipe structures disclosed in the prior art. The preferred structure limits the total weight requirement of glass fibers, particularly the wound filament fibers, which is one of the most expensive constituents of the wall structure. It will be understood that the wall structure and method of this invention may be modified as required by the particular application, as described above.

I claim:

1. In a wall for underground installation and the like and seving to confine a liquid, a wall structure comprising:
   a. a thermosetting resin matrix cured and comprising from about 30 to 40 percent by weight of said wall,
   b. chopped glass fibers randomly oriented and substantially uniformly distributed through said resin matrix, comprising from about 10 to 20 percent by weight of said wall;
   c. a pulverulent filler uniformly distributed in said resin matrix comprising about 15 to 60 percent of said wall, and
   d. filament wound, substantially continuous glass fibers within said resin matrix concentrated at the opposed exterior and interior portions of said wall, comprising about 5 to 30 percent by weight of said wall.

2. The wall construction defined in claim 1, characterized in that said exterior and interior portions of said wall each comprise about 20 percent of the total radial dimension of said wall, and about 80 percent of the total weight percent of said filament wound fibers being concentrated in said resin matrix wall portions, the chopped fiber and filler substantially evenly distributed in said resin matrix.

3. The wall construction defined in claim 2, wherein the minimum weight percent of resin is 40 percent.

4. The wall construction defined in claim 1, characterized in that said pulverulent filler is sand and comprises about 20 to 50 percent by weight of the total weight of said wall and said chopped glass fibers comprise about 15 percent by weight of said wall.

5. In a wall for underground installation and serving to confine a liquid, a wall structure comprising:
   a. a resin matrix consisting essentially of a thermosetting resin cured to a hardened state and comprising from 30 to 40 percent by weight of said wall;
   b. from 15 to 45 percent by weight total glass fibers embedded in said matrix, at least 5 percent by weight filament wound continuous fibers and at least 15 percent by weight chopped glass fibers embedded in said resin matrix, and
   c. from 20 to 50 percent sand embedded in said matrix, the proportions of sand and glass fibers varying throughout the thickness of said wall in inverse proportion to one another, the concentration of sand being greatest in the central portion of said wall and the concentration of glass fibers being greater at the interior and exterior portions of said wall and least at the central portion of said wall.

6. The wall construction defined in claim 5, characterized in that the total weight percent of said chopped glass fiber is about 10 to 20 percent and the total weight percent of said filament wound fibers is about 15 to 25 percent of said wall.

7. The wall construction defined in claim 5, characterized in that said interior and exterior portions of said wall each comprise about 20 percent of the total dimension of said wall and at least 60 percent of the total weight percent of said filament fibers are concentrated in said wall portions.

8. A drain pipe construction as defined in claim 5, characterized in that said exterior and interior portions of said wall each comprise about 20 percent of the total dimension of said wall and at least 90 percent of the total weight percent of said filament wound fibers and about 80 percent of the total weight percent of said chopped fibers are concentrated in said interior and exterior portions and about 80 percent of the total weight percent of said sand is concentrated in the central portion, between said interior and exterior wall portions.

9. A low pressure pipe as defined in claim 5, characterized in that said interior and exterior portions of said wall each comprise about 20 percent of the total radial dimension of said wall, and about 80 percent of the total weight percent of said filament fibers and about 60 percent of said chopped fibers are concentrated in said interior and exterior wall portions and about 80 percent of said sand is concentrated in the central portion, between said interior and exterior wall portions.

10. A high pressure pipe as defined in claim 5, characterized in that said interior and exterior portions of said wall each comprise about 20 percent of the total dimension of said wall, and about 60 percent of the total weight percent of said filament windings and about 40 percent of the total percent of said chopped fibers are located within said interior and exterior wall portions and about 70 percent of said sand is concentrated in the central portion between said interior and exterior wall portions.

11. In a composite wall structure suitable for confining a liquid in an underground installation having opposed surfaces, comprising:
   a. a thermosetting resin matrix,
   b. randomly oriented chopped glass fibers,
   c. a pulverulent filler, and
   d. filament wound, substantially continous glass fibers,
   wherein said resin and chopped glass fibers are substantially uniformly distributed throughout said wall structure, said pulverulent filler is relatively concentrated in the center portion of said wall structure in said resin matrix and said continuous wound glass fibers are concentrated adjacent said opposed wall surfaces in said resin matrix.

12. The wall structure defined in claim 11, characterized in that said center portion comprises about 60 percent of the total thickness of said wall structure.

13. The wall structure defined in claim 11, wherein said thermosetting resin matrix comprises from about 30 to 40 percent by weight of said wall, said glass fibers comprise about 15 to 50 percent of said wall and said pulverulent filler comprises about 15 to 60 percent of said wall.

* * * * *